(12) United States Patent
Dunham et al.

(10) Patent No.: US 9,878,674 B2
(45) Date of Patent: Jan. 30, 2018

(54) STORAGE ASSEMBLY AND VEHICLE INTERIOR TRIM ASSEMBLY EMPLOYING THE SAME

(71) Applicant: FORD GLOBAL TECHNOLOGIES, LLC, Dearborn, MI (US)

(72) Inventors: Scott Holmes Dunham, Redford, MI (US); Kathleen M Parlow, Columbus, MI (US); Elizabeth Cleary Johnston Tengler, Gross Pointe Park, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/658,321

(22) Filed: Mar. 16, 2015

(65) Prior Publication Data

US 2016/0272122 A1 Sep. 22, 2016

(51) Int. Cl.

| | |
|---|---|
| *B60R 7/00* | (2006.01) |
| *B60R 7/06* | (2006.01) |
| *B60R 7/08* | (2006.01) |
| *B60R 11/02* | (2006.01) |
| *B60R 13/02* | (2006.01) |
| *B60R 11/00* | (2006.01) |

(52) U.S. Cl.
CPC .............. *B60R 7/06* (2013.01); *B60R 7/087* (2013.01); *B60R 11/02* (2013.01); *B60R 13/02* (2013.01); *B60R 2011/0082* (2013.01); *B60R 2011/0094* (2013.01); *B60R 2013/0287* (2013.01)

(58) Field of Classification Search
CPC ........... B60R 7/06; B60R 7/087; B60R 11/02; B60R 13/02
USPC ...................................... 296/37.12
See application file for complete search history.

(56) References Cited

U.S. PATENT DOCUMENTS

| | | |
|---|---|---|
| 7,114,755 B1 | 10/2006 | Sturt et al. |
| 8,398,155 B2 | 3/2013 | Andochick |
| 8,714,093 B2 * | 5/2014 | Rigner ................... B60N 3/002 108/45 |
| 8,727,413 B2 | 5/2014 | Seiller et al. |
| 8,807,621 B2 | 8/2014 | Stephan |
| 2014/0153163 A1 | 6/2014 | Harding et al. |
| 2015/0291104 A1 * | 10/2015 | Kearney ................... B60R 7/04 296/37.12 |

* cited by examiner

*Primary Examiner* — Joseph D Pape
(74) *Attorney, Agent, or Firm* — LeClairRyan

(57) ABSTRACT

In one or more embodiments, a storage assembly to be at least partially received underneath a trim panel of a volume of space is provided to include a storage floor positioned at least partially within the volume of space, a first connector about which the storage floor pivots relative to the trim panel, a cover providing covering to the storage floor, and a second connector spaced apart from the first connector and supporting the cover such that the cover may be moved relative to the storage floor.

3 Claims, 6 Drawing Sheets

STORAGE ASSEMBLY AND VEHICLE INTERIOR TRIM ASSEMBLY EMPLOYING THE SAME

TECHNICAL FIELD

The present invention in one or more embodiments relates to a storage assembly, and in particular a storage assembly to be at least partially received underneath a trim panel of a volume of space such as a volume of space available from the instrumental panel or the central console of a vehicle.

BACKGROUND

Automotive interiors often feature a number of storage compartments for storing users' personal items or articles. A user or a driver may hope to have certain items such as navigation devices positioned in his/her view of sight to assist with driving directions.

By way of example, U.S. Pat. No. 8,807,621 discloses a storage unit for a dashboard, including a cover and a holder connected to each other and movable together relative to the dashboard.

SUMMARY

According to one or more embodiments, a storage assembly to be at least partially received underneath a trim panel of a volume of space is provided to include a storage floor positioned at least partially within the volume of space, a first connector about which the storage floor pivots relative to the trim panel, a cover providing covering to the storage floor, a second connector spaced apart from the first connector and supporting the cover such that the cover is movable relative to the storage floor, and a track supporting the first connector, the first connector being translatable relative to the track.

The cover may pivot about the second connector relative to the trim panel.

The cover may be slidable via the second connector relative to the trim panel.

The storage assembly may further include a back wall extending from the storage floor and supporting the second connector.

The cover may include a magnetic material.

The storage floor may include a first material and a second material different from the first material.

The cover may include one, two or more apertures, and when two or more apertures are included, at least two of which may be of different sizes relative to each other.

The trim panel may be part of an interior trim of a vehicle.

One or more advantageous features as described herein elsewhere will be readily apparent from the following detailed description of embodiments when taken in connection with the accompanying drawings.

BRIEF DESCRIPTION OF THE DRAWINGS

For a more complete understanding of one or more embodiments of this invention, reference should now be made to the embodiments illustrated in greater detail in the accompanying drawings and described below by way of examples wherein.

DETAILED DESCRIPTION OF ONE OR MORE EMBODIMENTS

Figure 1:
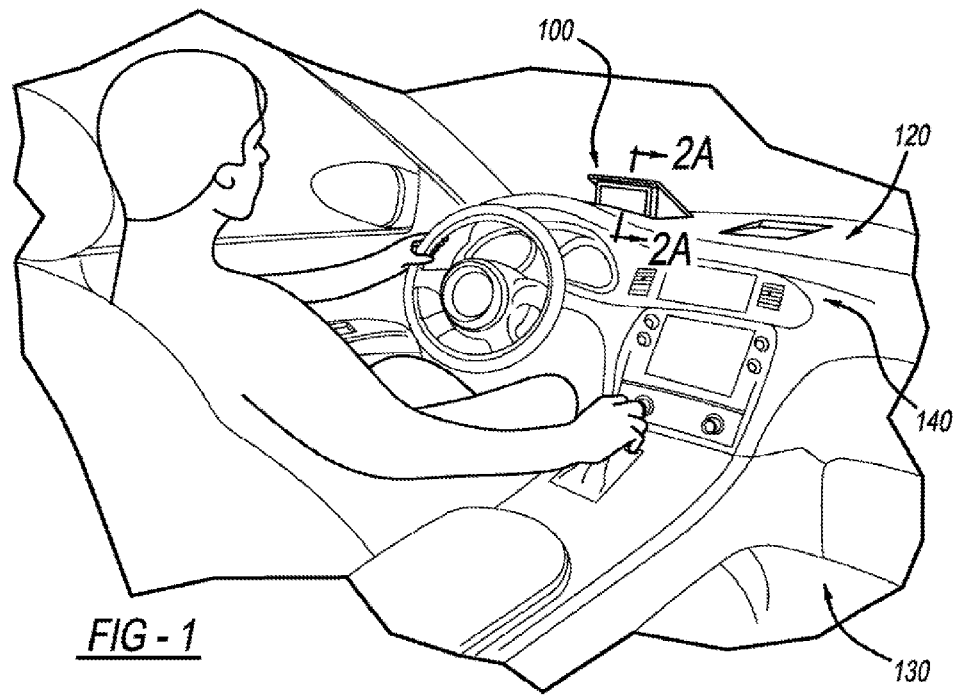
FIG. 1 illustratively depicts a storage assembly referenced in a vehicle interior according to one or more embodiments, wherein the storage assembly is at an in-use or open position.

As referenced in the FIGS., the same reference numerals are used to refer to the same components. In the following description, various operating parameters and components are described for different constructed embodiments. These specific parameters and components are included as examples and are not meant to be limiting.

As will be detailed herein elsewhere, the present invention in one or more embodiments is advantageous at least by providing a storage assembly to be at least partially received underneath a trim panel of a volume of space, wherein the vehicle interior space may be utilized relatively more efficiently, and wherein a user such as a driver may view and have access to the articles stored in the storage assembly with relatively enhanced ease.

In one or more embodiments, the term "trim panel" refers to a surface-forming panel inside a vehicle, an airplane, a ship or any other suitable motorized vessels that a driver or a passenger sees, where the surface-forming panel provides an aesthetic feel and/or a fashionable styling. Non-limiting examples of the trim panel include an instrument panel and a central console of a vehicle.

Figure 2A:
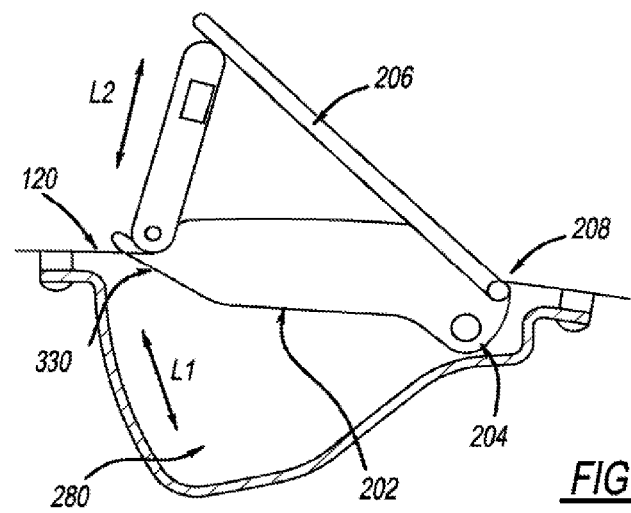
FIG. 2A illustratively depicts a cross-sectional view taken along line 2A-2A of the storage assembly referenced in FIG. 1.
Figure 2B:
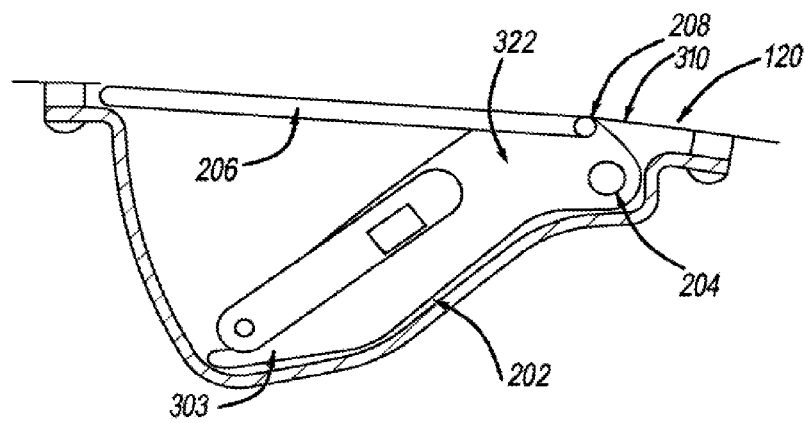
FIG. 2B illustratively depicts an alternative view of the storage assembly referenced in FIG. 2A, wherein the storage assembly is at a rest or closed position.

FIG. 1, FIG. 2A and FIG. 2B illustratively depict in various views of a storage assembly 100 according to one or more embodiments. For purpose of illustration, the storage assembly 100 is illustratively depicted as being at least partially received within a space of an instrumental panel or a central console 140 of a vehicle 130. The storage assembly 100 may be positioned at any other suitable locations within the vehicle 130.

In one or more embodiments, the storage assembly 100 is at least partially received underneath a trim panel 120 of a volume of space 280, including a storage floor 202 positioned at least partially within the volume of space 280, a first connector 204 about which the storage floor 202 pivots relative to the trim panel 120, a cover 206 providing covering to the storage floor 202, and a second connector 208 spaced apart from the first connector 204 and supporting the cover 206 such that the cover 206 moves relative to the storage floor 202. Further in view of FIG. 2A and FIG. 2B, the storage floor 202 may pivot about the first connector 204 between a first position illustratively depicted in FIG. 2A and a second position illustratively depicted in FIG. 2B, along a direction "L1." The first position may be one of those support positions at which the storage floor 202 along with the cover 206 collectively support the presentation to an operator of one or more items as stored on or supported by the storage floor 202. The second position may be one of those support positions at which the storage floor 202 along with the cover 206 collectively support the hidden storage of one or more items such that the items are neatly tucked under the trim panel 120 to reduce or eliminate visual discomfort due to clutter. These many positions may be realized or secured via any suitable methods such as one or more tension springs implemented onto or as part of the first connector 204.

As detailed herein elsewhere, the storage floor 202 is advantageously provided and positioned such that it may pivot relative to the trim panel 120 so as to ascend or descend along the direction "L1", with the optional positional change of the cover 206 relative to the trim panel 120 and/or the storage floor 202. Such structure may be particularly useful for the usage of the storage assembly 100, wherein the user may open the cover 206 to place items for storage, and may rotate the storage floor 202 later as needed to the open position as illustratively depicted in FIG. 1 and FIG. 2A, so that the items placed on the storage floor 202 may be in the user's direct view of sight for an easy retrieval.

In one or more embodiments, and further in view of FIG. 1, the storage assembly 100 is illustratively depicted as being at least partially received within a space at or near the instrument panel or the central console, facing toward the driver or the front row passenger. This may be particularly useful when the storage assembly 100 is used to store and hold navigation devices or other electronic devices for driving assistance, where the user or the driver may not necessarily have to look away much to be informed of the readings from the navigation devices while driving.

Further in view of FIG. 1 and FIG. 2A, the trim panel 120 of the space 280 may be part of or include the upper surface of the instrument panel or the central console. Accordingly, the cover 206 may be aligned with the upper surface of the instrument panel or the central console when the storage assembly 100 is at the closed position, providing a better aesthetic feel. The trim panel 120 may alternatively be separable and spaced apart from the upper surface of the instrument panel or the central console, where the cover 206 may be elevated or lowered relative to the trim panel 120. The storage assembly 100 may also be positioned on or near an armrest of a vehicle rear seat, or any other suitable locations within the vehicle. Accordingly, the trim panel 120 may be part of any suitable interior surface or trim of the vehicle.

Referring now to FIG. 2A and 2B, the storage floor 202 is at least partially received within the space 280. For purpose of illustration, the storage assembly 100 is shown as being at an open position in FIG. 2A and at a closed position in FIG. 2B. Further in view of FIG. 2B, the storage floor 202 may be entirely received within the space 280, and hidden via the cover 206. In certain other embodiments, only part of the storage floor 202 is received within the space 280, while being partially positioned outside of the space 280, such as above the trim panel 120 or an external or upper surface of the instrument panel or the central console. Accordingly, at least when in use, the storage assembly 100 may take advantage of space available outside of the space 280 for positioning or holding articles with relatively greater dimensions.

The storage assembly 100 further includes the first connector 204. The storage floor 202 may pivot about the first connector 204 along direction "L1" between the open position as depicted in FIG. 2A and the closed position as depicted in FIG. 2B relative to the trim panel 120. Accordingly, the storage floor 202 may be elevated up toward the user's view of sight by pivoting about the first connector 204 along direction "L1" to arrive at the open position, to provide relatively easy viewing of and access to the items positioned on the storage floor 202. To reach a rest or closed position, the storage floor 202 may be lowered into the space 280 by again pivoting about the first connector 204 to clear the view for the user.

In one embodiment, the storage assembly 100 may include a track supporting the first connector 204, which may be used to change the initial position of the first connector 204. In particular and referring to FIG. 4, at least one track 470 may be formed on and supported by a side wall such as the side walls 322, 324 referenced in FIG. 3 that together define the space 280. Accordingly, the first connector 204 may translate to a different position such as position 404 via the track 470, and may pivot relative to the trim panel 120 at any position while translating along the track 470. Accordingly, the storage floor 202 may pivot about the first connector 204 at any given position while the first connector 204 translates along the track 470.

Therefore by the use of the track 470, the storage floor 202 may be suitably varied in its starting position along a third direction "L3" and may pivot about the trim panel 120 at each of the starting positions along the direction "L3". Positional variation along the direction "L3", which is different from the direction "L1" or the direction "L2", provides additional design and use flexibility to the storage assembly 100.

The track 470 may provide an additional benefit. Referring back to FIG. 4, and when the storage floor 202 translates to a more elevated position at which the first connector is positioned at position 404, a front end 480 of the storage floor 202 (the end closer toward the user) may be supported on the trim panel 120. To facilitate this configuration, a down-standing lip 484 may further be provided to the front end 480 of the storage floor 202. The down-standing lip 484 may engage with a lower notch 488 when the first connector 204 is at its initial lower position and may engage with an upper notch 486 when the first connector 204 translates along the track 470 to its position at 404.

As is further detailed herein elsewhere, this may be particularly useful when the storage assembly 100 is used to store and/or support a navigation device. The track 470 upon which the first connector 204 translates to and from the position 404 may be supported on a wall defining the space 280 and/or at least one of the side walls 322, 324 illustratively depicted in FIG. 3. Any given position of the storage floor 202 as it ascends or descends may further be maintained via the use of any suitable methods, such as protrusion-cavity structures (not shown), or via the use of one or more tension springs as mentioned herein elsewhere.

Referring back to FIG. 2A, the storage assembly 100 further includes the cover 206 to provide covering to the storage floor 202 and/or the space 280. As is detailed herein elsewhere, the cover 206 may be aligned with, elevated or lowered relative to the trim panel 120 of the space 280. Although the cover 206 is illustrated in the discussed drawings in the shape of a flat panel, the cover 206 may be of any suitable shapes with any suitable surface patterns. In certain instances, the cover 206 may be configured or include arcs, protrusions and/or cavities.

In one or more embodiments, the cover 206 may include a magnetic material, so that the cover 206 may be moved back toward the storage floor 202 and be maintained at the closed position via the magnetic force. Additionally and/or alternatively the cover 206 may be stabilized relative to the storage floor 202 via any suitable mechanical method such as hooks, elastics, hinges and/or buckles.

Figure 3:
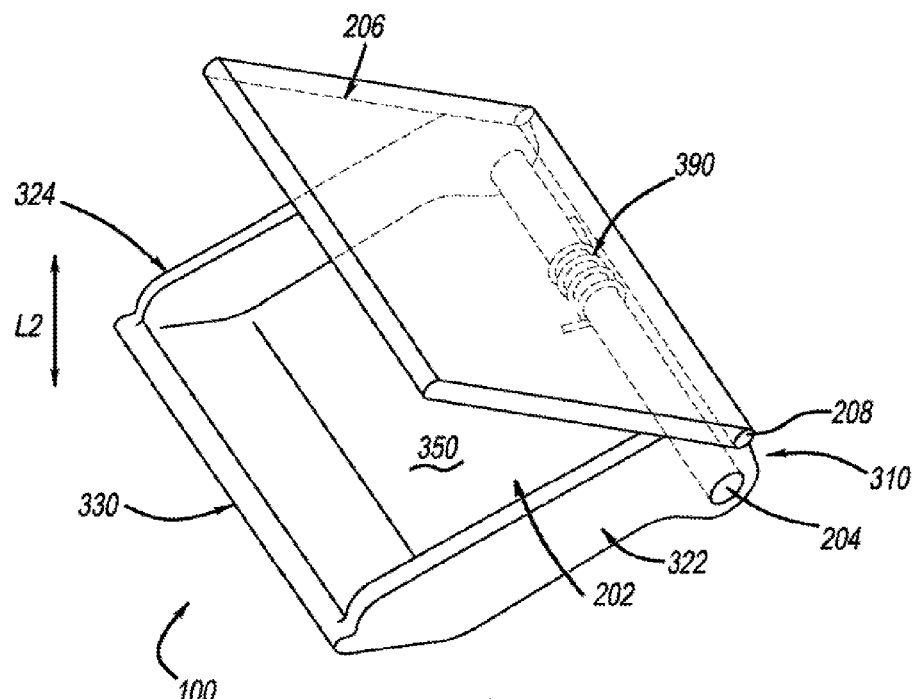
FIG. 3 illustratively depicts an alternative perspective view of the storage assembly referenced in FIG. 1.
Figure 4:
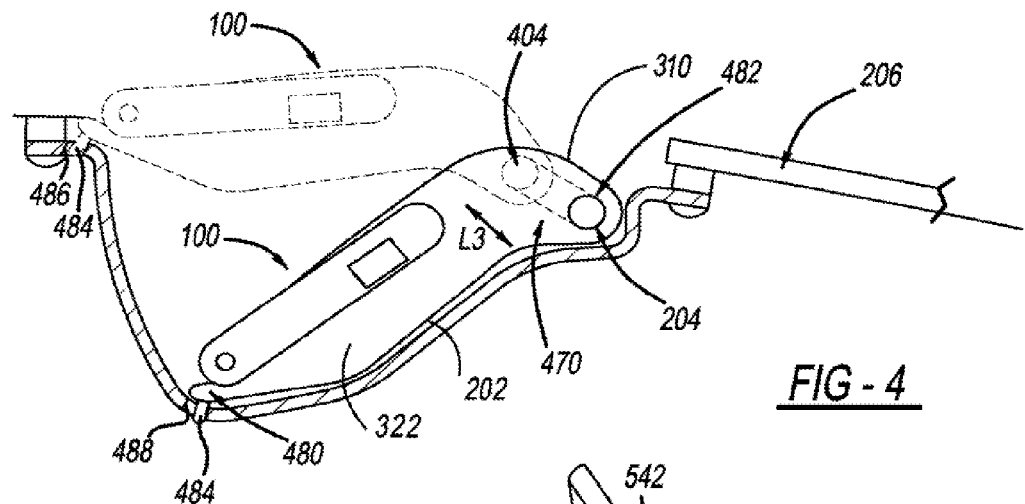
FIG. 4 illustratively depicts yet another alternative cross-sectional view of the storage assembly referenced in FIG. 1.

When including a magnetic material, the cover 206 may be conveniently used to at least temporally attract and hence visually present an article to the operator as soon as the cover 206 is in an open position such as the one illustratively depicted in FIG. 1, FIG. 2A or FIG. 3. In particular, and further in view of FIG. 6, articles such as keys 652 may be readily presentable to the user by being adhered to the cover 206 via one or more magnetic materials 662. The magnetic materials may be in separable patches or may be presented as an entire surface of the cover 206. The magnetic materials 662 may be built into and/or applied onto the cover 206 as necessary and suitable.

Figure 6:
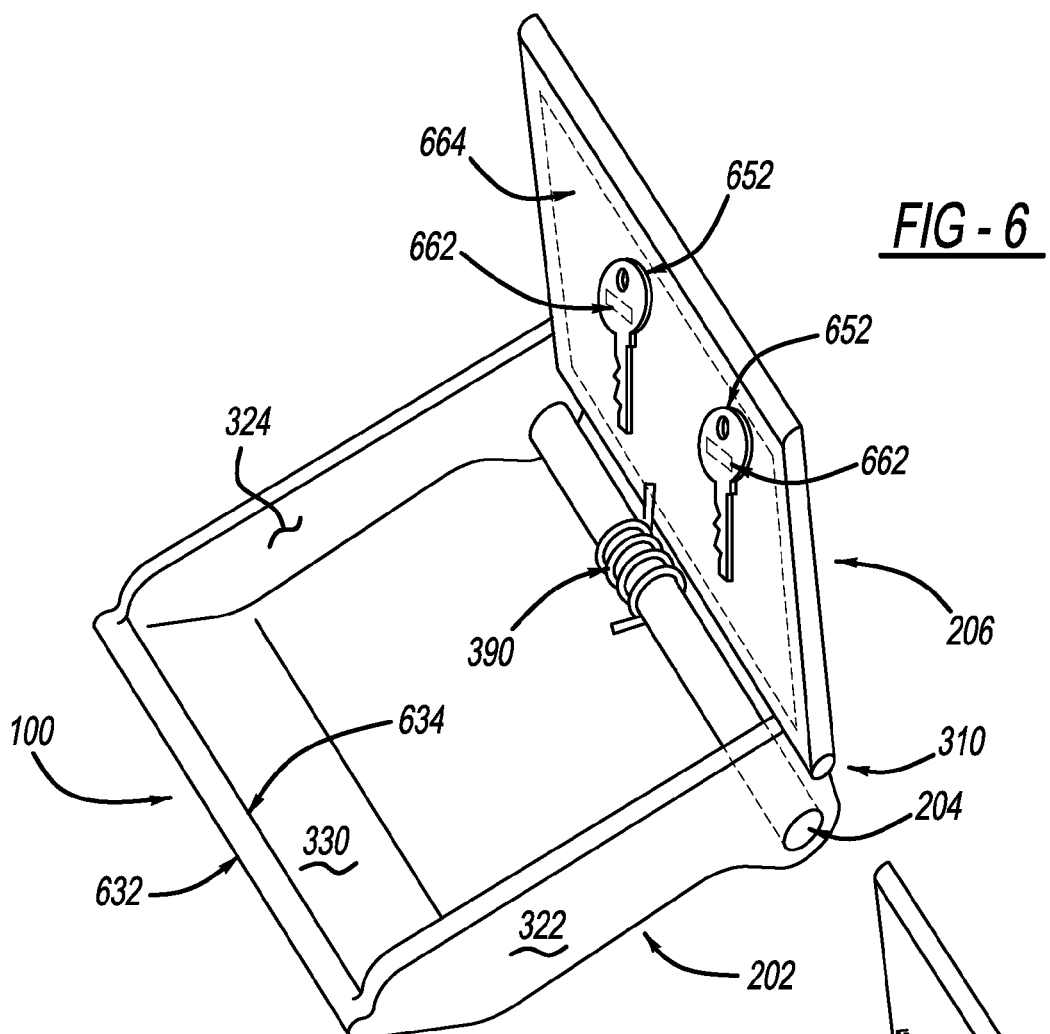
FIG. 6 illustratively depicts yet another perspective view of the storage assembly referenced in FIG. 1, FIG. 2A, FIG. 2B or FIG. 3.

Alternatively, and as illustratively depicted in FIG. 6, a magnetic material in the form of a magnetic layer 664 may be applied onto an interior side of the cover 206 such that magnetic force may be found more readily and easily on the cover 206.

In certain embodiments, and further in view of FIG. 2A to FIG. 3, the cover 206 may be supported on the second connector 208 spaced apart from the first connector 204, such that the cover 206 may move relative to the storage floor 202. Accordingly, the user may move the cover 206 along direction "L2," for instance, to deposit an item into or to retrieve an item out from the storage assembly 100 with further improved ease. Additionally, and when the cover 206 is movable relative to the storage floor 202 via the second connector 208, the storage floor 202 does not necessarily have to be elevated or lowered for the item storage or retrieval be carried out.

The second connector 208 may take any suitable form so as to facilitate the movement of the cover 206 relative to the trim panel 120 and/or the storage floor 202. The second connector 208 may include or be a pivot positioned on the trim panel 120 of the space 280, such that the cover 206 may pivot about the second connector 208 relative to the trim panel 120. Further, after the cover 206 transitions to an open position such as one depicted in FIG. 1 and FIG. 2A, the cover 206 may then be used along with the storage floor 202 to hold handy a device such as a navigation device. Further in view of FIG. 2A, FIG. 2B and FIG. 3, the storage assembly 100 may include a back wall 310 extending from the storage floor 202. The second connector 208 may take the form of a pivot and be supported on the back wall 310. In this way, the cover 206 may pivot relative to the storage floor 202 as well as the trim panel 120.

Referring back to FIG. 3, and in one or more embodiments, the storage assembly 100 may further include side walls 322, 324 and an anterior wall 330, all of which along with the back wall 310 collectively form a walled-up storage cavity 350. The walled-up storage cavity 350 may be particularly useful for storing items that may need to be physically confined to avoid unwanted movement. The effect of the confinement may further be enhanced with the concurrent use of the cover 206 positioned toward the walled-up storage cavity 350 along direction "L2."

Referring back to FIG. 2A and FIG. 2B and further in view of FIG. 3, each of the transitional positions at which the storage assembly 100 is to be maintained may be realized via any suitable mechanisms with non-limiting example thereof including the use of one or more tension springs. For instance, the first connector 204 may be implemented with one or more tension springs 390 to permit the realization of positional transitions along the direction "L2." For the same token, one or more tension springs (not shown) may be applied to the second connector 208 to help realize the positional transitions of the cover 206 relative to the storage floor 202.

As detailed herein elsewhere, the present invention advantageously provides a device and/or a method for at least temporarily storing handy articles such as keys, pens, note pads, and coins. For instance, and referring back to FIG. 6 further in view of FIG. 3, any one of the storage floor 202, the back wall 310, the side walls 322, 324, and the anterior wall 330 may be formed by two or more materials. For example, the storage floor 202 may include a first material (not shown) built into and/or applied onto an interior surface 634 of the anterior wall 330, and a second material (not shown) different with the first material that is built into and/or applied onto an exterior surface 632 of the anterior wall 330. In particular, the first material of the interior surface 634 may be a relatively more flexible material and arranged at an inner surface of the storage floor 202, such as the surface contacting one or more stored items, effecting desirable noise or vibration control. The second material of the exterior surface 632 may be a relatively more rigid material and arranged at an outer surface opposite to the inner surface, effecting desirable structure strength.

Figure 5A:
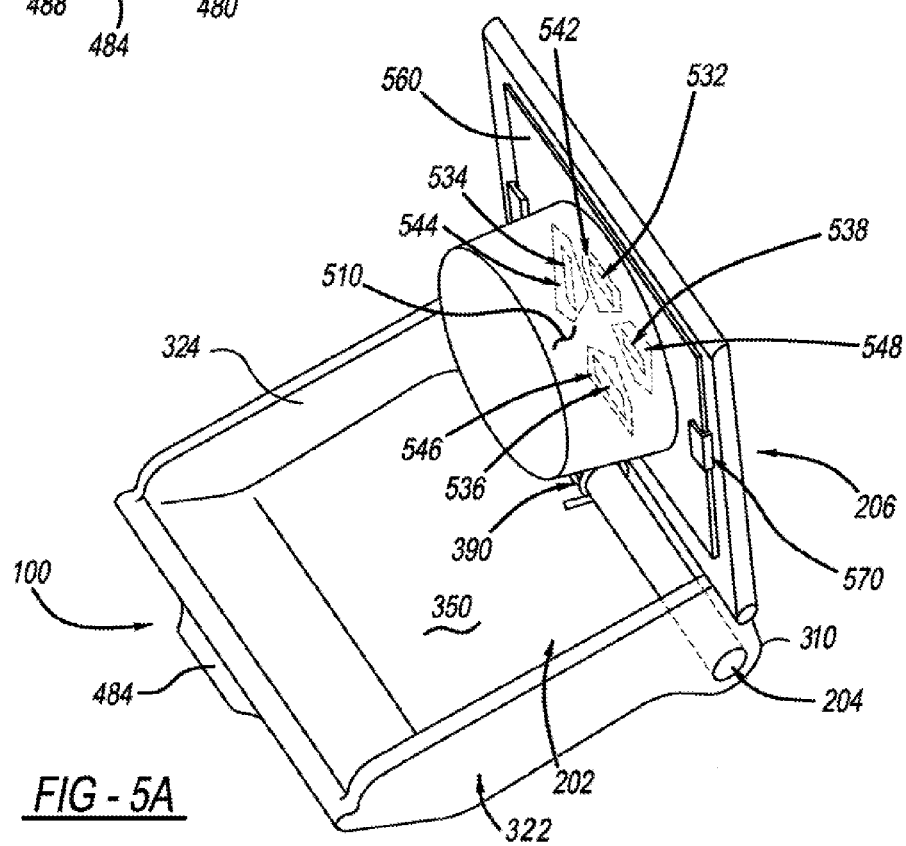
FIG. 5A illustratively depicts another perspective view of the storage assembly referenced in FIG. 1, FIG. 2A, FIG. 2B or FIG. 3.

In one or more embodiments and further in view of FIG. 5A, the cover 206 may include one or more through-holes or through apertures, such as apertures 532 to 538. In this way, small items may be placed into the storage assembly 100 without having to open the cover 206. For example, the cover 206 may include one, two or more apertures, and when two or more apertures are included, at least two of which may be of different size relative to each other. This configuration is particularly useful when the storage assembly 100 is used as a coin collector. More particularly, one of the apertures may be sized for depositing coins of a relatively smaller size such as a penny, a nickel, or a dime, and another one may be sized for depositing coins of a relatively greater size such as a quarter or a dollar coin.

Referring back to FIG. 5A, the aperture 532 may be sized for one or more dimes to pass through; the aperture 534 may be sized for one or more pennies to pass through; the aperture 536 may be sized for one or more quarters to pass through; and the aperture 538 may be sized for one or more nickels to pass through. The apertures 532 through 538 may be of any suitable orientations and more than one aperture of any coin sizes may be provided to any of collection compartments 542 through 548. The compartments 542 through 548 may be defined in view of free space available from the walled-up storage cavity 350 and may independently be of any suitable depth extending into the walled-up storage cavity 350.

Referring back to FIG. 5A, a coin cup 510 may be employed as a collector for coins deposited through any one of the apertures 532, 534, 536 and 538. Optionally the coin cup 510 is removable relative to the cover 206 via engagement between its edge panel 560 and one or more slide clips 570 positioned on the cover 206. The apertures 532, 534, 536 and 538 on the cover 206 may be aligned with apertures 542, 544, 546 and 548 located on the edge panel 560.

Figure 5B:
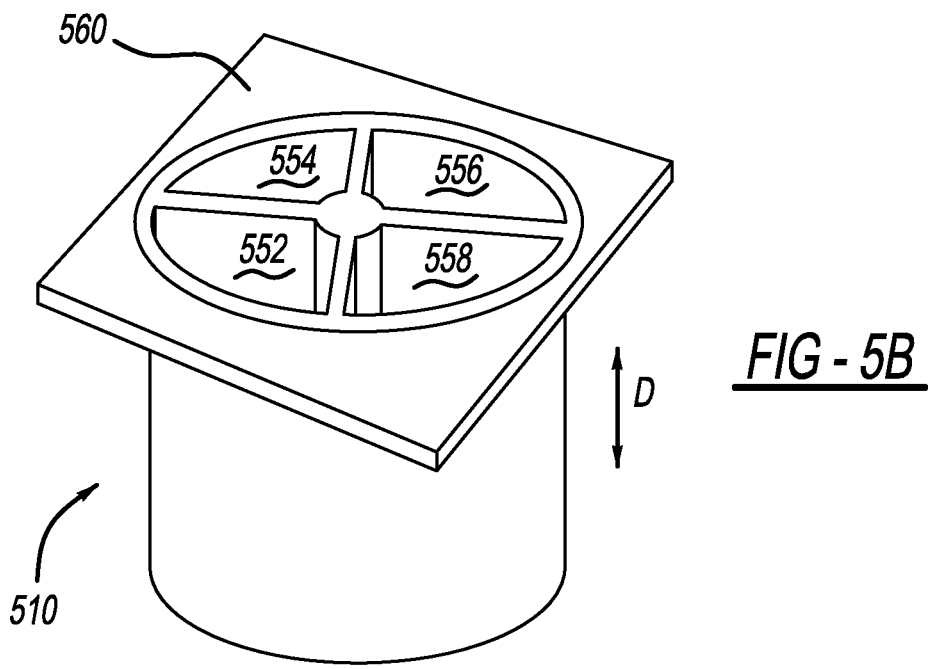
FIG. 5B illustratively depicts an alternative partial view of the storage assembly referenced in FIG. 5A.

In certain embodiments, and as illustratively depicted in FIG. 5B, the apertures 532, 534, 536 and 538 may take the form of compartments 552, 554, 556 and 558, respectively, along a depth direction "D" such that coins as deposited may be compartmentalized for an easy retrieval.

Figure 5C:
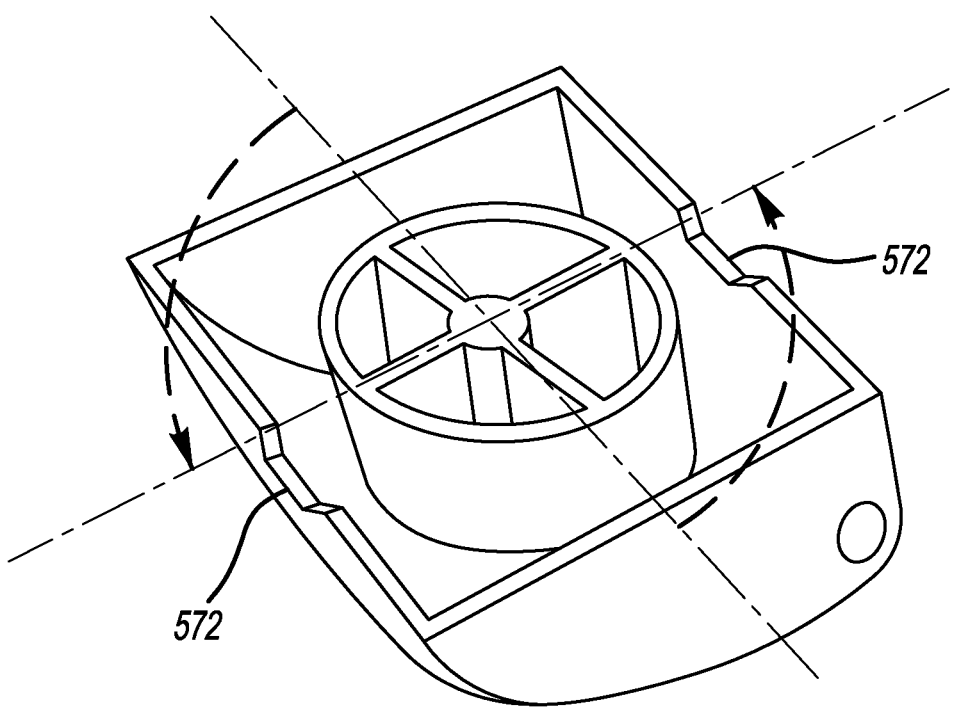
FIG. 5C illustratively depicts another alternative partial view of the storage assembly referenced in FIG. 5A.

In certain other embodiments, and as illustratively depicted in FIG. 5C, the edge panel 560 of the coin cup 510 may further include a pair of clearance notches 572 to align with the slider clips 570 when the coin cup is detached from the cover 206, is turned at an angle with the arrow shown by any suitable values such as about 75 to 115 degrees and placed inside the volume of space 350.

Figure 7A:
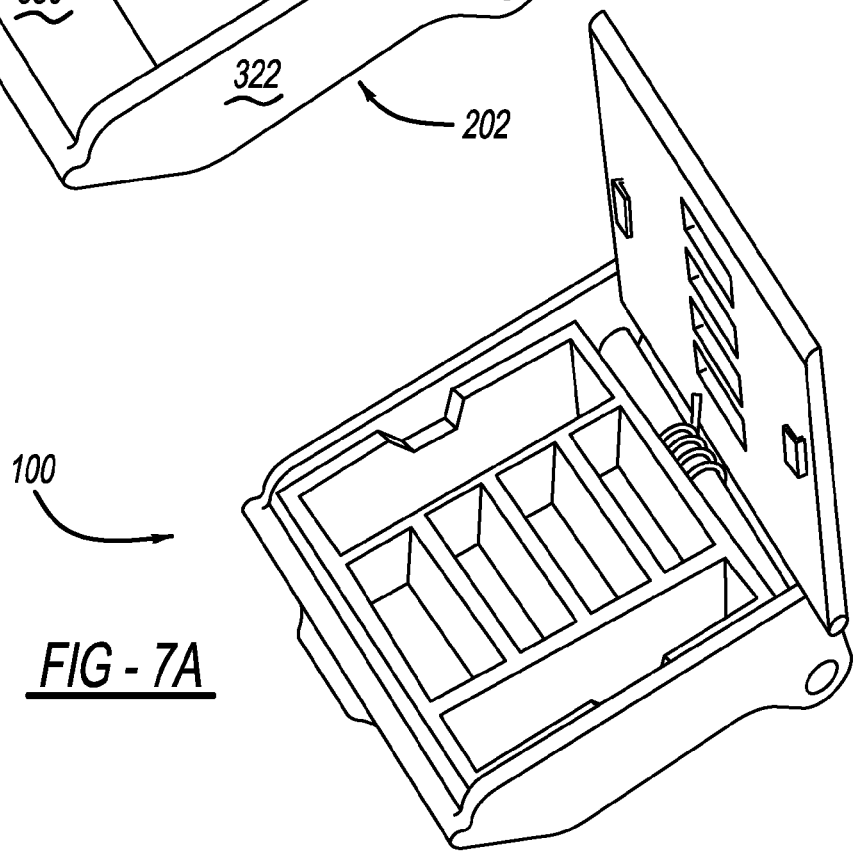
FIG. 7A illustratively depicts another perspective view of the storage assembly referenced in FIG. 1, FIG. 2A or FIG. 2B.
Figure 7B:
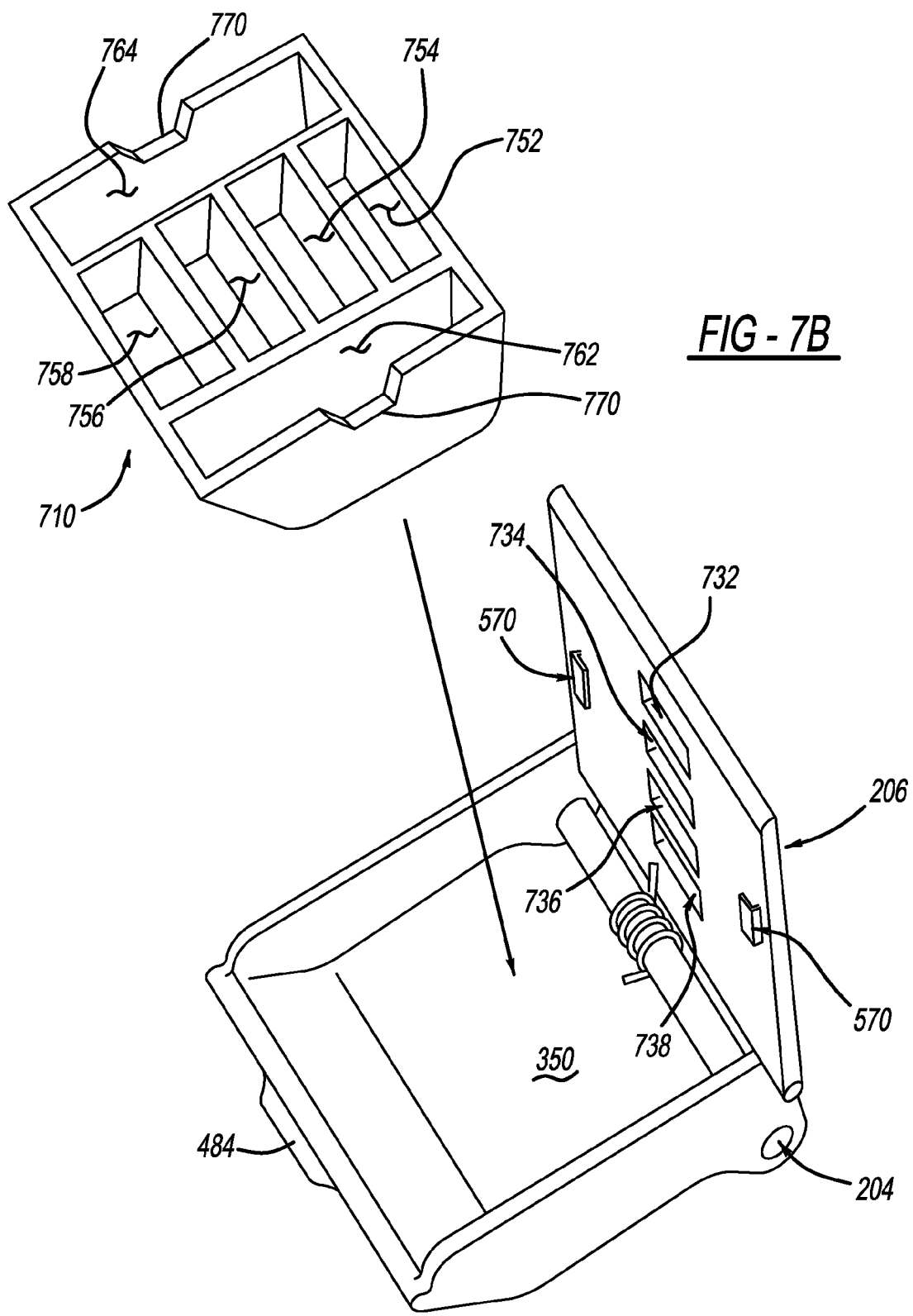
FIG. 7B illustratively depicts an exploded view of the storage assembly referenced in FIG. 7A.

In an alternative, and as illustratively depicted in FIG. 7A and FIG. 7B, instead of a detachable/removable coin cup 510, a detachable/removable tray insert 710 may be used to provide more versatility as to the type of items that may be stored. For instance, and referring back to FIG. 7B, the tray insert 710 may include side-by-side compartments 752, 754, 756 and 758 as receivers for coins of different sizes through coin slots 732, 734, 736 and 738, respectively. In addition, end storage compartments 762 and 764 may also be provided to store other items such as keys, USB cable, air refreshing potpourri or other handy items. Note compartments 762, 764 may be accessible when the tray insert is detached from the cover by disengagement from the slider clips 570, is turned by an angle of suitable degrees such as about 75 to 115 degrees and placed inside the volume of space 350. Similarly clearance notches 770 may be provided to align with the slider clips 570 when the cover 206 returns to its closed position.

The storage assembly 100 has been described herein in relation to a vehicle. However, the storage assembly 100 may be used in non-vehicle applications, such as airplanes, boats and ships.

As stated in the specification, the invention provides a storage assembly to be at least partially received underneath a trim panel of a volume of space. However, one skilled in the art will readily recognize from such discussion, and from the accompanying drawings and claims that various changes, modifications and variations can be made therein without departing from the true spirit and fair scope of the invention as defined by the following claims.

What is claimed is:

1. A storage assembly to be at least partially received underneath a trim panel defining a volume of space, comprising:
  a storage floor positioned at least partially within the volume of space;
  a first connector about which the storage floor pivots relative to the trim panel;
  a cover providing covering to the storage floor;
  a second connector spaced apart from the first connector and supporting the cover such that the cover is movable relative to the storage floor; and
  at least one of a side wall, a back wall, and an anterior wall extending form the storage floor,
  wherein the back wall extends from the storage floor and supports the second connector.

2. The storage assembly of claim 1, wherein the cover pivots about the second connector relative to the trim panel.

3. The storage assembly of claim 1, wherein the cover includes a magnetic material.

* * * * *